(12) United States Patent
Ahmed et al.

(10) Patent No.: US 12,585,322 B2
(45) Date of Patent: Mar. 24, 2026

(54) FALSE WAKEUP REDUCTION FOR FINGERPRINT SENSORS

(71) Applicant: QUALCOMM Incorporated, San Diego, CA (US)

(72) Inventors: Mohamed Ahmed, San Marcos, CA (US); Sandeep Louis D'Souza, San Diego, CA (US); Syed Fawad Ahmad, Escondido, CA (US); Jeffrey Osbeli Franco, Los Angeles, CA (US); Wei He, Pudong (CN); Suhail Jalil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/703,673

(22) PCT Filed: Dec. 30, 2021

(86) PCT No.: PCT/CN2021/142974
§ 371 (c)(1),
(2) Date: Apr. 22, 2024

(87) PCT Pub. No.: WO2023/123185
PCT Pub. Date: Jul. 6, 2023

(65) Prior Publication Data
US 2025/0004531 A1    Jan. 2, 2025

(51) Int. Cl.
*G06V 40/13* (2022.01)
*G06F 1/3234* (2019.01)
*G06F 21/32* (2013.01)
(52) U.S. Cl.
CPC ............ *G06F 1/3262* (2013.01); *G06F 21/32* (2013.01); *G06V 40/1306* (2022.01)

(58) Field of Classification Search
None
See application file for complete search history.

(56) References Cited

U.S. PATENT DOCUMENTS 9,710,048 B2 * 7/2017 Zhao .................... G06F 3/0488
10,572,270 B1 2/2020 Sampath et al.
(Continued)

FOREIGN PATENT DOCUMENTS

CN        106469014 A      3/2017
CN        107291313 A     10/2017
(Continued)

OTHER PUBLICATIONS

International Search Report and Written Opinion—PCT/CN2021/142974—ISA/EPO—Sep. 27, 2022.
(Continued)

*Primary Examiner* — Joseph R Haley
(74) *Attorney, Agent, or Firm* — QUALCOMM Incorporated

(57) ABSTRACT

An apparatus (101) includes a fingerprint sensor (102) including a wakeup sensor portion (202) and a transmitter portion (207). The wakeup sensor portion (202) may be configured to send an activation signal (204) to the transmitter portion (207) due to a contact indication, corresponding to contact with an outer surface of the apparatus (101) in the fingerprint sensor area that equals or exceeds a contact indication threshold. A control system (106) of the apparatus (101) may include: a fingerprint sensor control system portion (206a) configured for controlling the transmitter portion (207) and for determining, based at least in part on fingerprint sensor data obtained from an object in contact with the outer surface of the apparatus (101) in the fingerprint sensor area, whether the object is a finger: a fingerprint image data processing control system portion (206b); and a wakeup reduction module (305) configured to control the
(Continued)

Sending, due to a contact indication corresponding to contact of an object with an outer surface of an apparatus in a fingerprint sensor area, an activation signal to a transmitter portion of a fingerprint sensor residing in a fingerprint sensor area of the apparatus, the contact indication equaling or exceeding a contact indication threshold — 405

Determining, based at least in part on fingerprint sensor data obtained from the object, whether the object is a finger — 410

Controlling the contact indication threshold based, at least in part, on one or more time intervals between consecutive false wakeups, a false wakeup comprising an activation of the transmitter portion not due to a finger contact on the outer surface of the apparatus in the fingerprint sensor area — 415

400 contact indication threshold based, at least in part, on one or more time intervals between consecutive false wakeups.

19 Claims, 12 Drawing Sheets

(56) References Cited

U.S. PATENT DOCUMENTS

| | | | |
|---|---|---|---|
| 2003/0141959 A1 | 7/2003 | Keogh et al. | |
| 2011/0312285 A1* | 12/2011 | Amir | H04W 52/0225 |
| | | | 455/69 |
| 2015/0346834 A1 | 12/2015 | Martinez Fernandez et al. | |
| 2018/0224955 A1 | 8/2018 | Chen et al. | |
| 2018/0276443 A1 | 9/2018 | Strohmann et al. | |
| 2018/0335889 A1* | 11/2018 | Tucker | G06F 3/04186 |
| 2018/0369866 A1* | 12/2018 | Sammoura | G06F 3/043 |
| 2019/0073507 A1 | 3/2019 | D'Souza et al. | |

| | | | |
|---|---|---|---|
| 2019/0205612 A1* | 7/2019 | Huang | G06V 10/94 |
| 2021/0389859 A1 | 12/2021 | Tyler | |
| 2022/0187919 A1* | 6/2022 | Tang | G06F 3/0436 |

FOREIGN PATENT DOCUMENTS

| | | |
|---|---|---|
| CN | 108108683 A | 6/2018 |
| CN | 108496156 A | 9/2018 |
| CN | 112420041 A | 2/2021 |
| CN | 113239777 A | 8/2021 |

OTHER PUBLICATIONS

Lorincz J., et al., "A Survey on the Energy Detection of OFDM Signals with Dynamic Threshold Adaptation: Open Issues and Future Challenges", Sensors (Base), vol. 21, 3080, published on Apr. 28, 2021, pp. 1-41.

Supplementary European Search Report—EP21969549—Search Authority—The Hague—Aug. 12, 2025.

* cited by examiner

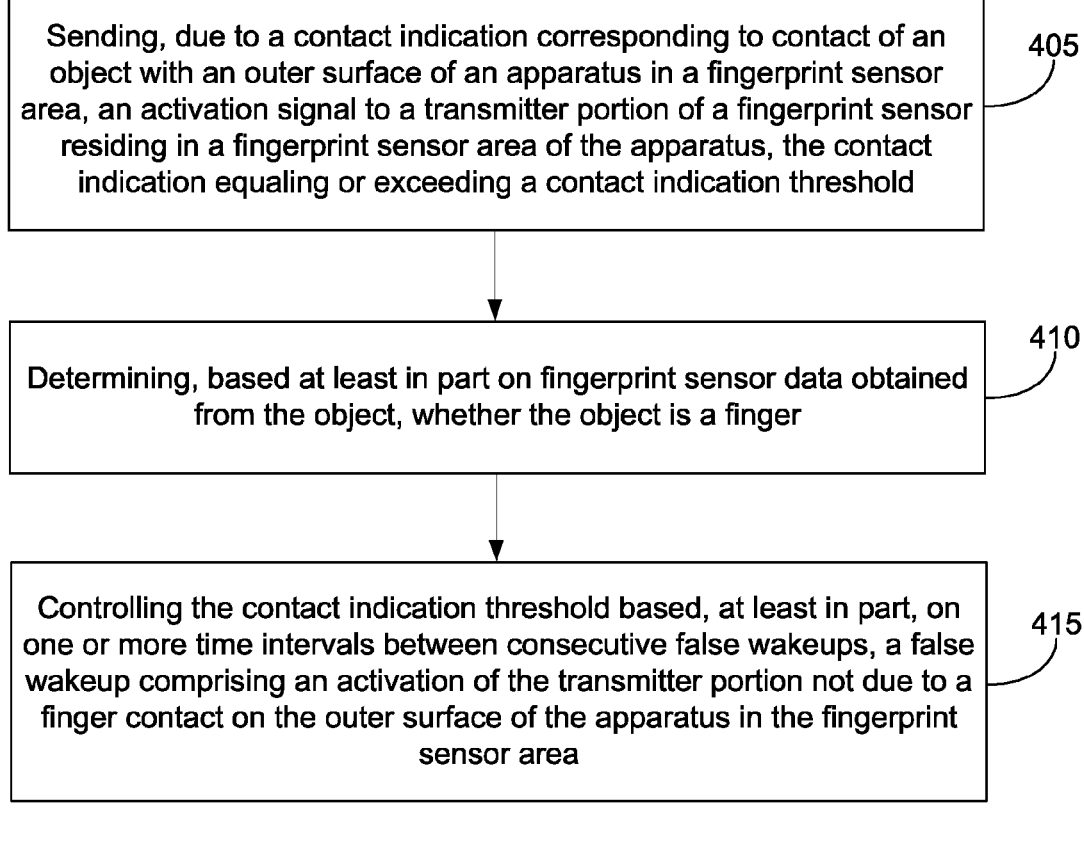

Sending, due to a contact indication corresponding to contact of an object with an outer surface of an apparatus in a fingerprint sensor area, an activation signal to a transmitter portion of a fingerprint sensor residing in a fingerprint sensor area of the apparatus, the contact indication equaling or exceeding a contact indication threshold

405

Determining, based at least in part on fingerprint sensor data obtained from the object, whether the object is a finger

410

Controlling the contact indication threshold based, at least in part, on one or more time intervals between consecutive false wakeups, a false wakeup comprising an activation of the transmitter portion not due to a finger contact on the outer surface of the apparatus in the fingerprint sensor area

Receiving, by a first portion of a control system, at least one sensor signal, the at least one sensor signal being associated with at least one of contact of an object with an outer surface of an apparatus or movement of the apparatus, the first portion of a control system being configured for controlling fingerprint image data processing

1105

Controlling communications between a second portion of a control system and the first portion of the control system based, at least in part, on the at least one sensor signal, the second portion of the control system being configured for controlling a transmitter portion of a fingerprint sensor

1110

FALSE WAKEUP REDUCTION FOR FINGERPRINT SENSORS

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor residing in a fingerprint sensor area of the apparatus. The fingerprint sensor may include a wakeup sensor portion and a transmitter portion. The wakeup sensor portion may be configured to send an activation signal to the transmitter portion due to a contact indication corresponding to contact with an outer surface of the apparatus in the fingerprint sensor area that equals or exceeds a contact indication threshold.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may include a fingerprint sensor control system portion configured for controlling the transmitter portion and for determining, based at least in part on fingerprint sensor data obtained from an object in contact with the outer surface of the apparatus in the fingerprint sensor area, whether the object is a finger. In some examples, the control system may include a fingerprint image data processing control system portion. In some examples, the control system may include a wakeup reduction module configured to control the contact indication threshold based, at least in part, on one or more time intervals between consecutive false wakeups. A false wakeup may, for example, be an activation of the transmitter portion, by the wakeup sensor portion, not due to a finger contact on the outer surface of the apparatus in the fingerprint sensor area.

In some examples, the wakeup reduction module may be configured to increase the contact indication threshold if a time interval between consecutive false wakeups is less than a first time threshold. According to some examples, the wakeup reduction module may be configured to decrease the contact indication threshold if a time interval between consecutive false wakeups is greater than or equal to a second time threshold.

In some implementations, the fingerprint sensor may include a piezoelectric sensor component. In some such examples, the contact indication threshold may correspond with a piezoelectric threshold. In some examples, the fingerprint sensor control system portion may be, or may include, a dedicated processor on which the piezoelectric sensor component resides.

In some examples, the wakeup reduction module may be a component of the fingerprint sensor control system portion. In some implementations, the wakeup reduction module may be configured to control the contact indication threshold based, at least in part, on whether a count of most recent consecutive false wakeups exceeds a consecutive false wakeup count threshold. In some instances, the control system may be further configured to reset a count of most recent consecutive false wakeups if the fingerprint sensor control system portion determines that the object is a finger.

According to some implementations, the apparatus may include a touch sensor, a pressure sensor, or both a touch sensor and a pressure sensor. In some such implementations, the wakeup reduction module may be configured to control the contact indication threshold based, at least in part, on one or more touch sensor signals, on one or more pressure sensor signals or on both one or more touch sensor signals and one or more pressure sensor signals. In some implementations, the fingerprint sensor control system portion may be integrated with the touch sensor, with the pressure sensor, or with both the touch sensor and the pressure sensor.

In some implementations, the apparatus may include a microphone, a gyroscope, an accelerometer, or combinations thereof. In some such implementations, the wakeup reduction module may be configured to control the contact indication threshold based, at least in part, on one or more of microphone signals, gyroscope signals or accelerometer signals.

Other innovative aspects of the subject matter described in this disclosure may be implemented in a method. In some examples, the method may involve sending, due to a contact indication corresponding to contact of an object with an outer surface of an apparatus in a fingerprint sensor area, an activation signal to a transmitter portion of a fingerprint sensor residing in a fingerprint sensor area of the apparatus. In some examples, the contact indication may equal or exceed a contact indication threshold. The method may involve determining, based at least in part on fingerprint sensor data obtained from the object, whether the object is a finger. The method may involve controlling the contact indication threshold based, at least in part, on one or more time intervals between consecutive false wakeups.

In some examples, the method may involve increasing the contact indication threshold if a time interval between consecutive false wakeups is less than a first time threshold. In some examples, the method may involve decreasing the contact indication threshold if a time interval between consecutive false wakeups is greater than or equal to a second time threshold.

In some implementations, the fingerprint sensor may include a piezoelectric sensor component. In some such examples, the contact indication threshold may correspond with a piezoelectric threshold.

In some examples, the method may involve controlling the contact indication threshold based, at least in part, on whether a count of most recent consecutive false wakeups exceeds a consecutive false wakeup count threshold. According to some examples, the method may involve resetting a count of most recent consecutive false wakeups if it is determined that the object is a finger. In some examples, the method may involve controlling the contact indication threshold based, at least in part, one or more of a touch sensor signal, a pressure sensor signal, a microphone signal, a gyroscope signal or an accelerometer signal.

Still other innovative aspects of the subject matter described in this disclosure may be implemented in a method. In some examples, the method may involve receiving, by a first portion of a control system, at least one sensor signal. The at least one sensor signal may be associated with at least one of contact of an object with an outer surface of an apparatus or movement of the apparatus. The first portion of the control system may be configured for controlling fingerprint image data processing. In some examples, the method may involve controlling communications between a second portion of a control system and the first portion of the control system based, at least in part, on the at least one sensor signal. The second portion of the control system may, in some examples, be configured for controlling a transmitter portion of a fingerprint sensor.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve sending, due to a contact indication corresponding to contact of an object with an outer surface of an apparatus in a fingerprint sensor area, an activation signal to a transmitter portion of a fingerprint sensor residing in a fingerprint sensor area of the apparatus. In some examples, the contact indication may equal or exceed a contact indication threshold. The method may involve determining, based at least in part on fingerprint sensor data obtained from the object, whether the object is a finger. The method may involve controlling the contact indication threshold based, at least in part, on one or more time intervals between consecutive false wakeups.

In some examples, the method may involve increasing the contact indication threshold if a time interval between consecutive false wakeups is less than a first time threshold. In some examples, the method may involve decreasing the contact indication threshold if a time interval between consecutive false wakeups is greater than or equal to a second time threshold.

In some implementations, the fingerprint sensor may include a piezoelectric sensor component. In some such examples, the contact indication threshold may correspond with a piezoelectric threshold.

In some examples, the method may involve controlling the contact indication threshold based, at least in part, on whether a count of most recent consecutive false wakeups exceeds a consecutive false wakeup count threshold. According to some examples, the method may involve resetting a count of most recent consecutive false wakeups if it is determined that the object is a finger. In some examples, the method may involve controlling the contact indication threshold based, at least in part, one or more of a touch sensor signal, a pressure sensor signal, a microphone signal, a gyroscope signal or an accelerometer signal.

In some examples, the method may involve receiving, by a first portion of a control system, at least one sensor signal.

The at least one sensor signal may be associated with at least one of contact of an object with an outer surface of an apparatus or movement of the apparatus. The first portion of the control system may be configured for controlling fingerprint image data processing. In some examples, the method may involve controlling communications between a second portion of a control system and the first portion of the control system based, at least in part, on the at least one sensor signal. The second portion of the control system may, in some examples, be configured for controlling a transmitter portion of a fingerprint sensor.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 4 is a flow diagram that provides examples of operations according to some disclosed methods.

FIG. 11 is a flow diagram that provides examples of operations according to some additional disclosed methods.

DETAILED DESCRIPTION

Figure 1:
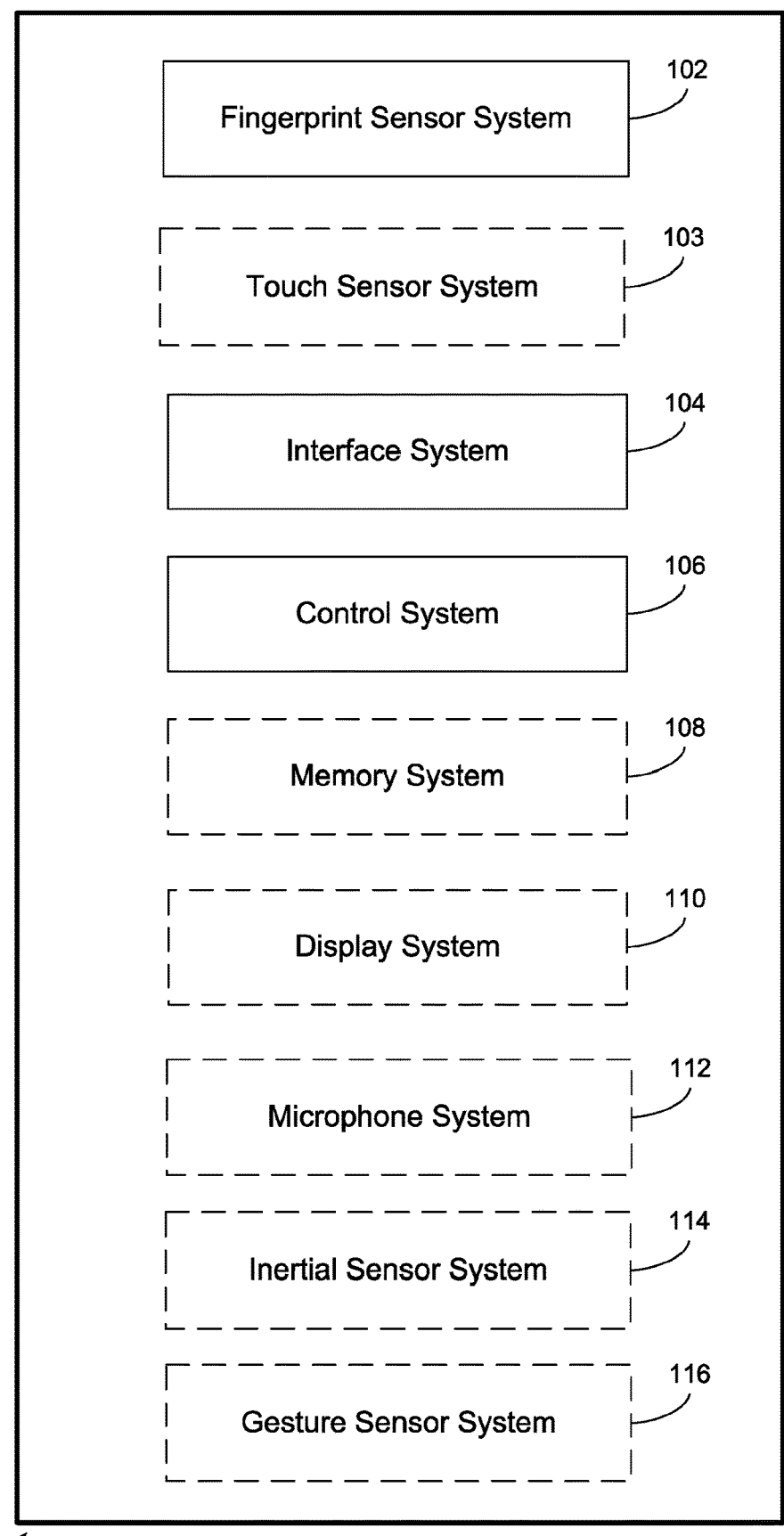
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many types of biometric sensors, such as fingerprint sensors, are susceptible to false wakeups. As used herein, a "false wakeup" of a fingerprint sensor refers to an activation of at least a portion of the fingerprint sensor (such as a transmitter portion) due to an event other than a user's actual authentication attempt. One example of a false wakeup is an activation of at least a portion of the fingerprint sensor due to an event other than a finger contact in a fingerprint sensor area on the outer surface of an apparatus that includes the fingerprint sensor. The apparatus that includes the fingerprint sensor may, for example, be a mobile device such as a cellular telephone or another type of hand-held device. As used herein, the terms "handset" and "hand-held device" are used synonymously. In some examples, a false wakeup may be caused when a user carrying a mobile device that includes the fingerprint sensor is walking, running, fidgeting with the mobile device, etc. In some instances, a false wakeup may be caused when the mobile device is carried in a user's pocket, for example when the mobile device contacts other objects in the pocket, the user's body, etc.

False wakeups can cause many types of negative effects. For example, false wakeups of a fingerprint sensor may cause power to be wasted by pointlessly activating a transmitter of the fingerprint sensor. In addition to wasting power, unnecessarily activating a fingerprint sensor's transmitter may shorten the life of the transmitter and may therefore shorten the life of the fingerprint sensor itself. In some instances, false wakeups of a fingerprint sensor may cause power to be wasted by unnecessarily activating an image processing portion of the fingerprint sensor, or of a device that includes the fingerprint sensor. False wakeups of a fingerprint sensor may, in some instances, cause numerous unintentional biometric authentication attempts which can lead to temporary "lock-ups" during which the biometric authentication functionality is disabled because a threshold number of authentication attempts has been exceeded. When a mobile device locks up, the user may only be able to unlock the mobile device by entering a code. In such cases, the biometric sensor non-functional and this negatively impacts the user experience.

Some disclosed methods may involve sending, due to a contact indication (an indication that may be associated with contact of an object with an outer surface of an apparatus in a fingerprint sensor area), an activation signal to a transmitter portion of a fingerprint sensor residing in a fingerprint sensor area of the apparatus. The contact indication may, in some instances, equal or exceed a contact indication threshold. Some such methods may involve determining, based at least in part on fingerprint sensor data obtained from the object, whether the object is a finger. Some such methods may involve controlling the contact indication threshold based, at least in part, on one or more time intervals between consecutive false wakeups.

Particular implementations of the subject matter described in this disclosure may be implemented to realize one or more of the following potential advantages. Some disclosed methods can substantially reduce the number of false wakeups of a fingerprint sensor. Less power is wasted if there are fewer false wakeups. Moreover, a fingerprint sensor's transmitter is unnecessary used less often if there are fewer false wakeups, so the fingerprint sensor may have a relatively longer lifetime. Having fewer false wakeups also may enhance the user experience, not least because the user will experience fewer lock-ups.

FIG. 1 is a block diagram that shows example components of an apparatus according to some disclosed implementations. In this example, the apparatus 101 includes a fingerprint sensor system 102, an interface system 104 and a control system 106. Some implementations may include a touch sensor system 103, a memory system 108, a display system 110, a microphone system 112, an inertial sensor system 114 and/or a gesture sensor system.

According to some examples, the fingerprint sensor system 102 may be, or may include, an ultrasonic fingerprint sensor. Alternatively, or additionally, in some implementations the fingerprint sensor system 102 may be, or may include, another type of fingerprint sensor, such as an optical fingerprint sensor, a photoacoustic fingerprint sensor, etc. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The optional touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the inertial sensor system 114, one or more interfaces between the control system 106 and the gesture sensor system 116 and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the display system 110. In implementations wherein the apparatus includes a fingerprint sensor system 102, the control system 106 is configured for communication with, and for controlling, the fingerprint sensor system 102. In implementations wherein the apparatus includes a touch sensor system 103, the control system 106 is configured for communication with, and for controlling, the touch sensor system 103. In implementations wherein the apparatus includes a memory system 108 that is separate from the control system 106, the control system 106 also may be configured for communication with the memory system 108. In implementations wherein the apparatus includes a microphone system 112, the control system 106 is configured for communication with, and for controlling, the microphone system 112. In implementations wherein the apparatus includes an inertial sensor system 114, the control system 106 is configured for communication with, and for controlling, the inertial sensor system 114. According to some examples, the control system 106 may include one or more dedicated components that are configured for controlling the fingerprint sensor system 102, the touch sensor system 103, the memory system 108, the display system 110, the microphone system 112 and/or the inertial sensor system 114.

Some examples of dedicated components that are configured for controlling at least a portion of the fingerprint sensor system 102 (and/or for processing fingerprint image data received from the fingerprint sensor system 102) are described below. Although the control system 106 and the fingerprint sensor system 102 are shown as separate components in FIG. 1, in some implementations at least a portion of the control system 106 and at least a portion of the fingerprint sensor system 102 may be co-located. For example, in some implementations one or more components of the fingerprint sensor system 102 may reside on an integrated circuit or "chip" of the control system 106. According to some implementations, functionality of the control system 106 may be partitioned between one or more controllers or processors, such as between a dedicated sensor controller and an applications processor (also referred to herein as a "host" processor) of an apparatus, such as a host processor of a mobile device. In some such implementations, at least a portion of the host processor may be configured for fingerprint image data processing, determination of whether currently-acquired fingerprint image data matches previously-obtained fingerprint image data (such as fingerprint image data obtained during an enrollment process), etc.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

In some examples, the apparatus 101 includes a display system 110, which may include one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include an inertial sensor system 114. The inertial sensor system 114 may include one or more types of inertial sensors, such as one or more gyroscopes and/or one or more accelerometers. The inertial sensor system 114 may be configured to provide inertial sensor data to the control system 106 indicating the orientation of the apparatus 101, acceleration of the apparatus 101, etc.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2:
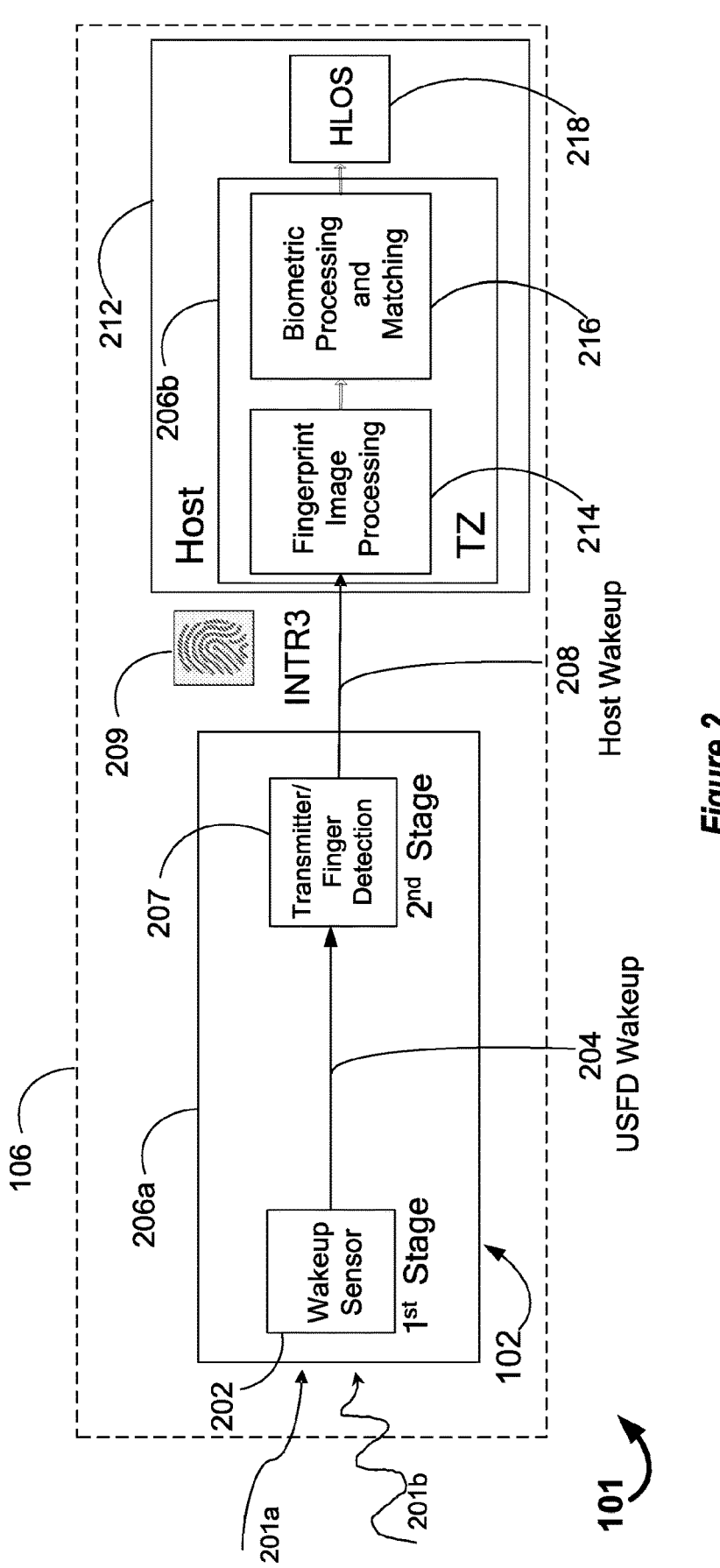
FIG. 2 shows an example of the apparatus of FIG. 1.

FIG. 2 shows an example of the apparatus of FIG. 1. As with other disclosed implementations, the scale, numbers, arrangements and types of the elements shown in FIG. 2 are merely presented for illustrative purposes. Other implementations of the apparatus 101 may have different numbers, arrangements and/or types of elements.

In this example, the apparatus 101 includes a fingerprint sensor system 102 and a control system 106, which are instances of the fingerprint sensor system 102 and control system 106 that are described above with reference to FIG. 1. According to this example, the fingerprint sensor system 102 includes a wakeup sensor portion 202 and a transmitter portion 207. In this implementation, the fingerprint sensor system 102 is, or includes, an ultrasonic fingerprint sensor. In other examples, the fingerprint sensor system 102 may be, or may include, another type of fingerprint sensor, such as an optical fingerprint sensor, a photoacoustic fingerprint sensor, etc.

According to this implementation, the control system 106 includes a fingerprint sensor control system portion 206a and a fingerprint image data processing control system portion 206b. In this implementation, the fingerprint sensor control system portion 206a is implemented via a dedicated processor, which in this example is an integrated circuit or "chip" of the control system 106. In some examples, one or more components of the fingerprint sensor system 102 may reside on the same chip that implements the fingerprint sensor control system portion 206a. In the example shown in FIG. 2, at least the wakeup sensor portion 202 and the transmitter portion 207 of the fingerprint sensor system 102 reside on the same chip that implements the fingerprint sensor control system portion 206a.

In this example, the fingerprint sensor control system portion 206a is configured to control the transmitter portion 207. According to this implementation, the fingerprint sensor control system portion 206a is also configured to determine, based at least in part on fingerprint sensor data obtained from an object in contact with the outer surface of the apparatus in the fingerprint sensor area, whether the object is a finger. The fingerprint sensor control system portion 206a may, in some examples, be capable of maintaining the transmitter portion 207 in an "off" state when operating the wakeup sensor portion 202 in a force-sensing mode, which in some implementations may not require power to be applied to the wakeup sensor portion 202.

In this implementation, the fingerprint image data processing control system portion 206b is configured to process fingerprint image data 209 obtained by the fingerprint sensor system 102 due to receiving an host wakeup signal 208 and fingerprint image data 209 from the fingerprint sensor control system portion 206a. According to this example, the fingerprint image data processing control system portion 206b includes a fingerprint image processing module 214 and a biometric processing and matching module 216. In this example, the fingerprint image processing module 214 and the biometric processing and matching module 216 reside in a trusted zone (TZ) of a host processor 212. In some instances, the fingerprint image processing module 214 may be configured to determine fingerprint features, such as fingerprint minutiae, based on the fingerprint image data 209. According to some examples, the biometric processing and matching module 216 may be configured to determine whether a currently-obtained set of fingerprint minutiae matches a previously-obtained set of fingerprint minutiae, the latter of which may have been obtained during an enrollment process. According to this implementation, the host processor 212 is a multi-purpose processor that is also configured to run a high-level operating system (HLOS) 218. The host processor 212 may, for example, be a multi-core processor. In some examples, one of the cores may be used to implement the fingerprint image data processing control system portion 206b.

In this example, the wakeup sensor portion 202 is configured to send an activation signal 204 to the transmitter portion 207, e.g., due to a detected force or acceleration. In FIG. 2, the term "USFD Wakeup" is associated with activation signal 204, because in this example the activation signal 204 also causes an ultrasonic finger detection (USFD) process to be initiated. In some examples, the wakeup sensor portion 202 may be configured to send an activation signal to the transmitter portion 207 due to what may be referred to herein as a "contact indication," which is an indication of contact with an outer surface of the apparatus 101 in a fingerprint sensor area. In some such examples, the wakeup sensor portion 202 may be configured to send an activation signal to the transmitter portion 207 due to a contact indication that equals or exceeds a contact indication threshold.

In some instances, the contact indication may correspond with an object in contact with an outer surface of the apparatus in the fingerprint sensor area, such as a finger touch or tap intended for biometric authentication (element 201a of FIG. 2). According to some such examples, the contact indication threshold may be a force threshold, a pressure threshold, etc. In some implementations, at least a portion of the fingerprint sensor system 102 (such as the wakeup sensor portion 202) may include a piezoelectric sensor component. In some such examples, the contact indication threshold may correspond with a piezoelectric threshold, such as a voltage threshold of electrical signals produced by the piezoelectric sensor component. However, in some examples the contact indication may correspond with one or more other signals, such as one or more touch sensor signals from a touch sensor system, one or more pressure sensor signals from a pressure sensor system, etc.

In other instances, the contact indication may not correspond with a finger touch. In some such examples, the contact indication may correspond with one or more vibrations, accelerations, rotations or other disturbances (element 201b of FIG. 2), which may be interpreted as a contact indication by the fingerprint sensor control system portion 206a. In some examples, the contact indication (and, in some examples, the contact indication threshold) may correspond with one or more inertial sensor signals from an inertial sensor system, such as one or more signals from an accelerometer and/or from a gyroscope. Alternatively, or additionally, the contact indication (and, in some examples, the contact indication threshold) may correspond with one or more microphone signals from a microphone system.

According to this example, due to the activation signal 204 the transmitter portion 207 will transmit ultrasonic waves towards an object that is presumed to be in an area of contact. In this implementation, the fingerprint sensor control system portion 206a is configured to determine, based at least in part on fingerprint sensor data corresponding with ultrasonic waves reflected the object, whether the object is a finger.

In some examples, the wakeup sensor portion 202 and the transmitter portion 207 may be implemented via different functions of the same device, or by different functions of portions of the same device, e.g., as logical blocks or modules. In some such implementations, the wakeup sensor portion 202 and the transmitter portion 207 may be regarded as processing stages performed by the same device, or by portions of the same device, as suggested by the phrase "$1^{st}$ Stage" adjacent to the wakeup sensor portion 202 and the phrase "$2^{nd}$ Stage" adjacent to the transmitter portion 207. According to some such examples, the ultrasonic fingerprint sensor system 102 may include a piezoelectric layer that is configured to function as an ultrasonic transceiver. The piezoelectric layer may, for example, be configured to function as the transmitter portion 207 by transmitting ultrasonic waves when a voltage is applied. However, the same piezoelectric layer, or at least a portion of the same piezoelectric layer, may be configured to detect an applied force even when the ultrasonic fingerprint sensor system 102 is not powered on. This condition may be referred to herein as a "force-sensing mode." In some such implementations, the same piezoelectric layer, or at least a portion of the same piezoelectric layer, may be configured to function as the wakeup sensor portion 202.

However, in some implementations the wakeup sensor portion 202 and the transmitter portion 207 may be implemented via separate physical devices, or by separate portions of the same physical device. For example, in some implementations the fingerprint sensor system 102 may be, or may include, an ultrasonic fingerprint sensor. In some such implementations, the ultrasonic fingerprint sensor system 102 may include separate ultrasonic transmitter and receiver portions, such as an ultrasonic transmitter layer and an ultrasonic receiver array. According to some such examples, the wakeup sensor portion 202 may be implemented by at least a portion of the ultrasonic transmitter layer or by at least a portion of the ultrasonic receiver array.

As noted above, in some instances the activation signal 204 will cause a "false wakeup," such as an activation of the transmitter portion 207 that is not due to a finger contact on the outer surface of the apparatus in the fingerprint sensor area. In this implementation, the fingerprint sensor control system portion 206a may detect a false wakeup by determining, based at least in part on fingerprint sensor data obtained from an object in contact with the outer surface of the apparatus in the fingerprint sensor area, that the object is not a finger (or by determining that activation of the transmitter portion 207 was not due to any object touching the outer surface of the apparatus in the fingerprint sensor area). In some instances, the fingerprint sensor control system portion 206a may not detect a false wakeup if, for example, the fingerprint sensor control system portion 206a detects a finger or a finger-like object at a time during which a user was not intending to initiate an authentication process. In some such examples, the false wakeup may cause the fingerprint sensor control system portion 206a to send a host wakeup signal 208 to the fingerprint image data processing control system portion 206b, needlessly causing at least a portion of the host processor 212 to use power.

As noted above, false wakeups can cause many types of negative effects. For example, false wakeups of a fingerprint sensor may cause power to be wasted by pointlessly activating the transmitter portion 207. In addition to wasting power, unnecessarily activating the transmitter portion 207 may shorten the life of the transmitter portion 207 and may therefore shorten the life of the fingerprint sensor system 102. In some instances, false wakeups of a fingerprint sensor may cause power to be wasted by unnecessarily activating the fingerprint image data processing control system portion 206b. Moreover, false wakeups may, in some instances, cause "lock-ups," which can cause user frustration.

Some disclosed methods can mitigate false wakeups. Some such methods may involve controlling a contact indication threshold based, at least in part, on one or more time intervals between consecutive false wakeups.

Figure 3A:
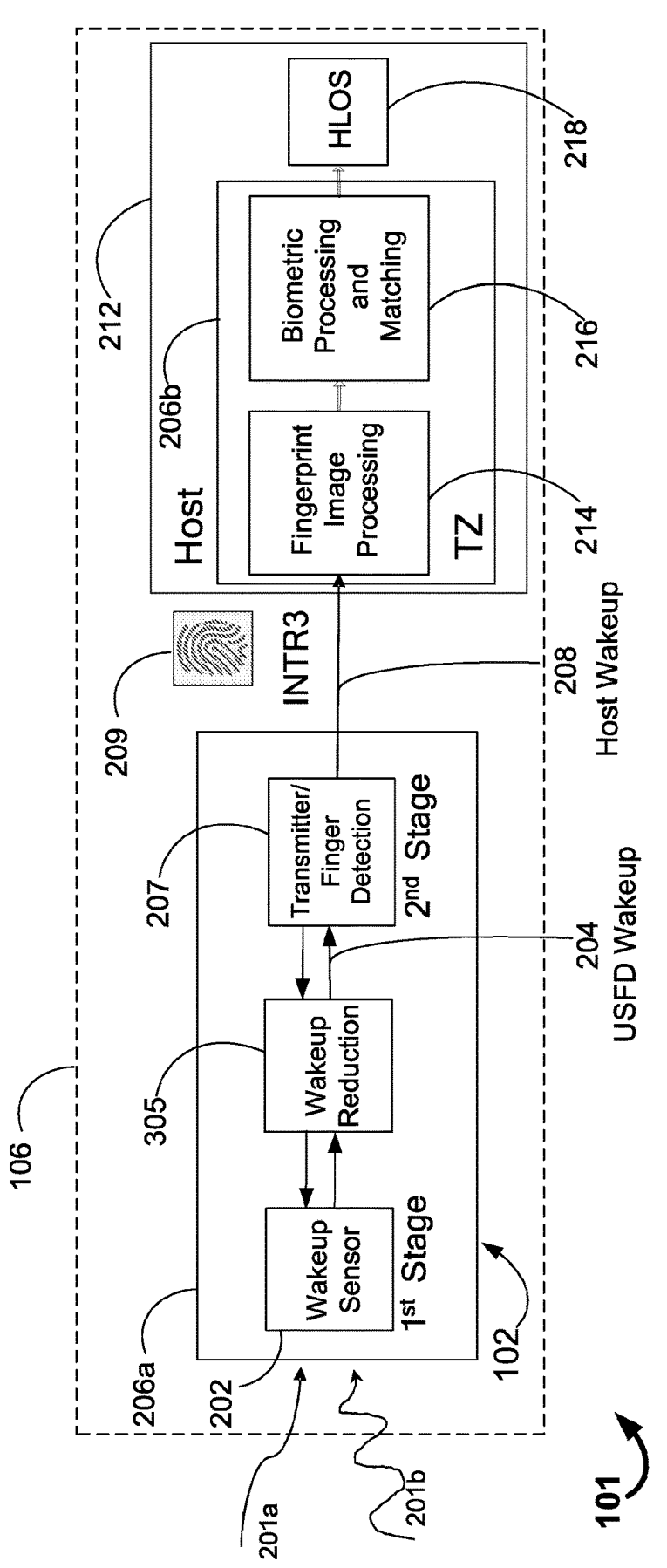
FIG. 3A shows example blocks of an apparatus that is configured to mitigate false wakeups.

FIG. 3A shows example blocks of an apparatus that is configured to mitigate false wakeups. As with other disclosed implementations, the scale, numbers, arrangements and types of the elements shown in FIG. 3A are merely presented for illustrative purposes. Other implementations of the apparatus 101 may have different numbers, arrangements and/or types of elements.

In this example, the apparatus 101 includes a fingerprint sensor system 102 and a control system 106, which are instances of the fingerprint sensor system 102 and control system 106 that are described above with reference to FIG. 1. In this implementation, the fingerprint sensor system 102 is, or includes, an ultrasonic fingerprint sensor. In other examples, the fingerprint sensor system 102 may be, or may include, another type of fingerprint sensor, such as an optical fingerprint sensor, a photoacoustic fingerprint sensor, etc. According to this example, the fingerprint sensor system 102 and the control system 106 include the components that are described herein with reference to FIG. 2. Except as noted in the description of FIG. 3A, the reader may assume that the components of FIG. 3A that are also shown in FIG. 2 function as described with reference to FIG. 2.

In addition to the components shown in FIG. 2, in the example shown in FIG. 3A the control system 106 also includes a wakeup reduction module 305. In this example, the wakeup reduction module 305 is configured to reduce the number of false wakeups of the transmitter portion 207 that could, in the absence of the wakeup reduction module 305, be triggered by the wakeup sensor portion 202. By reducing the number of false wakeups of the transmitter portion 207, the wakeup reduction module 305 also may reduce false wakeups of the fingerprint image data processing control system portion 206*b*. According to this example, the wakeup reduction module 305 is a component of the fingerprint sensor control system portion 206*a*: in this example, the wakeup reduction module 305 resides on a chip that is configured to implement the fingerprint sensor control system portion 206*a*. In this example, the wakeup reduction module 305 resides in a communication path between the wakeup sensor portion 202 and the transmitter portion 207, both of which also reside on the chip that is configured to implement the fingerprint sensor control system portion 206*a*.

As noted above, in some examples, the wakeup sensor portion 202 may be configured to send an activation signal due to a "contact indication" (an indication of contact with an outer surface of the apparatus in the fingerprint sensor area) that equals or exceeds a contact indication threshold. Accordingly, the term "contact indication threshold" as used herein refers to a threshold of a contact indication. Such a threshold may be used by the control system (e.g., by the fingerprint sensor control system portion 206*a*) to determine whether the wakeup sensor portion 202 will send an activation signal.

In some instances, the contact indication may correspond with an object in contact with an outer surface of the apparatus in the fingerprint sensor area, such as a finger touch or tap intended for biometric authentication (see element 201*a* of FIG. 3A). According to some such examples, the contact indication threshold may be a force threshold, a pressure threshold, etc. In some implementations, at least a portion of the fingerprint sensor system 102 (such as the wakeup sensor portion 202) may include a piezoelectric sensor component. In some such examples, the contact indication threshold may correspond with a piezoelectric threshold, such as a voltage threshold of electrical signals produced by the piezoelectric sensor component. However, in some examples the contact indication may correspond with one or more other signals, such as one or more touch sensor signals from a touch sensor system, one or more pressure sensor signals from a pressure sensor system, etc.

In other instances, the contact indication may not correspond with a finger touch. In some such examples, the contact indication may correspond with one or more vibrations, accelerations, rotations or other disturbances (element 201*b* of FIG. 3A), which may be interpreted as a contact indication by the fingerprint sensor control system portion 206*a*. In some such examples, the contact indication (and, in some instances, the contact indication threshold) may correspond with one or more inertial sensor signals from an inertial sensor system, such as one or more signals from an accelerometer and/or from a gyroscope. Alternatively, or additionally, the contact indication (and, in some instances, the contact indication threshold) may correspond with one or more microphone signals from a microphone system.

According to some implementations, the wakeup reduction module 305 may be configured to reduce the number of false wakeups of the transmitter portion 207 by controlling the contact indication threshold (for example, the contact indication threshold that is currently being used by the wakeup sensor portion 202). In some implementations, the wakeup reduction module 305 may be configured to control the contact indication threshold based, at least in part, on one or more time intervals between consecutive false wakeups (for example, false wakeups determined by the fingerprint sensor control system portion 206*a* according to a finger detection process involving the transmitter portion 207). For example, the wakeup reduction module 305 may be configured to increase the contact indication threshold if a time interval between consecutive false wakeups is less than a first time threshold. In some such examples, the wakeup reduction module 305 may be configured to increase the contact indication threshold if the time interval between consecutive false wakeups is less than or equal to the first time threshold.

The first time threshold may vary according to the particular implementation. In some instances, the first time threshold may be on the order of hundreds of milliseconds (ms) or seconds. In some examples, the first time threshold may be 600 ms, 700 ms, 800 ms, 900 ms, 1 second, 1100 ms, 1200 ms, 1300 ms, 1400 ms, etc.

In some instances, consecutive false wakeups that are occurring within a time interval that is less than or equal to the first time threshold may be caused by the same type of event. For example, consecutive false wakeups that are occurring within a time interval that is less than or equal to the first time threshold may be caused by a jogging or running motion of the user, by one or more non-finger objects repeatedly contacting an apparatus that includes the fingerprint sensor system 102 (e.g., one or more objects in a user's pocket along with a mobile device that includes the fingerprint sensor system 102), etc. In some such examples, if the wakeup reduction module 305 increases the contact indication threshold when the time interval between such consecutive false wakeups is less than or equal to the first time threshold, the contact indication threshold may be increased to a level at which the event(s) that were causing the consecutive false wakeups will no longer cause false wakeups.

In some implementations, the wakeup reduction module 305 may be configured to decrease the contact indication threshold if a time interval between consecutive false wakeups is greater than or equal to a second time threshold. In some instances, the second time threshold may be greater than or equal to the first time threshold. For example, the second time threshold may be 1 second, 1100 ms, 1200 ms, 1300 ms, 1400 ms, 1500 ms, 1600 ms, 1700 ms, 1800 ms, 1900 ms, 2 seconds, etc. Decreasing the contact indication threshold if the time interval between consecutive false wakeups is greater than or equal to the second time threshold can provide potential advantages. For example, if the time interval between consecutive false wakeups is greater than or equal to the second time threshold, this may indicate that whatever was previously causing the consecutive false wakeups is no longer causing false wakeups. Decreasing the contact indication threshold may allow greater wakeup sensitivity for actual attempts to initiate an authentication process. For example, decreasing the contact indication threshold may allow greater wakeup sensitivity when a user subsequently places a finger in a fingerprint sensor area during an actual authentication attempt.

According to some examples, the wakeup reduction module 305 may be configured to control the contact indication threshold based, at least in part, on whether a count of most recent consecutive false wakeups exceeds a consecutive false wakeup count threshold. In some examples, the consecutive false wakeup count threshold may be a single-digit threshold, such as 2, 3, 4, 5, 6, 7, 8 or 9. Such implementations can allow the wakeup reduction module 305 to establish a metric that indicates the relative persistence of the underlying cause of the false wakeups, or a lack thereof. For example, if the consecutive false wakeup count threshold is 3 and the underlying cause of the false wakeups persists for only 2 false wakeups, in some examples no due increase of the contact indication threshold will result.

Such implementations may be potentially advantageous. For example, the contact indication threshold may only be increased only due to an indication that the underlying cause of the false wakeups is relatively persistent. In such instances, increasing the contact indication threshold may be justified and advantageous. However, if the underlying cause of the false wakeups does not persist, then increasing the contact indication threshold may not be justified and may be disadvantageous: as noted elsewhere herein, increasing the contact indication threshold causes the wakeup process to be relatively less sensitive to user input, such as placement of a finger in a fingerprint sensor area of an apparatus.

In some implementations, the control system 106 may be configured to reset a count of most recent consecutive false wakeups if an object in contact with the outer surface of the apparatus in the fingerprint sensor area is determined to be a finger. For example, the count of most recent consecutive false wakeups may be set to zero if the fingerprint sensor control system portion 206a determines that the object is a finger.

As noted elsewhere herein, in some implementations the apparatus 101 may include a touch sensor and/or a pressure sensor. In some such implementations, the wakeup reduction module 305 may be configured to control the contact indication threshold (and/or configured to otherwise control the fingerprint sensor system 102) based, at least in part, on one or more touch sensor signals, on one or more pressure sensor signals or on both one or more touch sensor signals and one or more pressure sensor signals. According to some implementations, the fingerprint sensor control system portion 206a may be integrated with the touch sensor and/or the pressure sensor: for example, the touch sensor and/or the pressure sensor may reside on the same chip.

As described elsewhere herein (for example, with reference to FIG. 1), in some implementations the apparatus 101 may include microphone system 112 and/or an inertial sensor system 114. In some such implementations, the wakeup reduction module 305 may be configured to control the contact indication threshold (and/or configured to otherwise control the fingerprint sensor system 102) based, at least in part, on one or more microphone signals from the microphone system 112. According to some such examples, the wakeup reduction module 305 may be configured to control the contact indication threshold (and/or configured to otherwise control the fingerprint sensor system 102) based, at least in part, on one or more gyroscope signals and/or one or more accelerometer signals from the inertial sensor system 114.

Figure 3B:
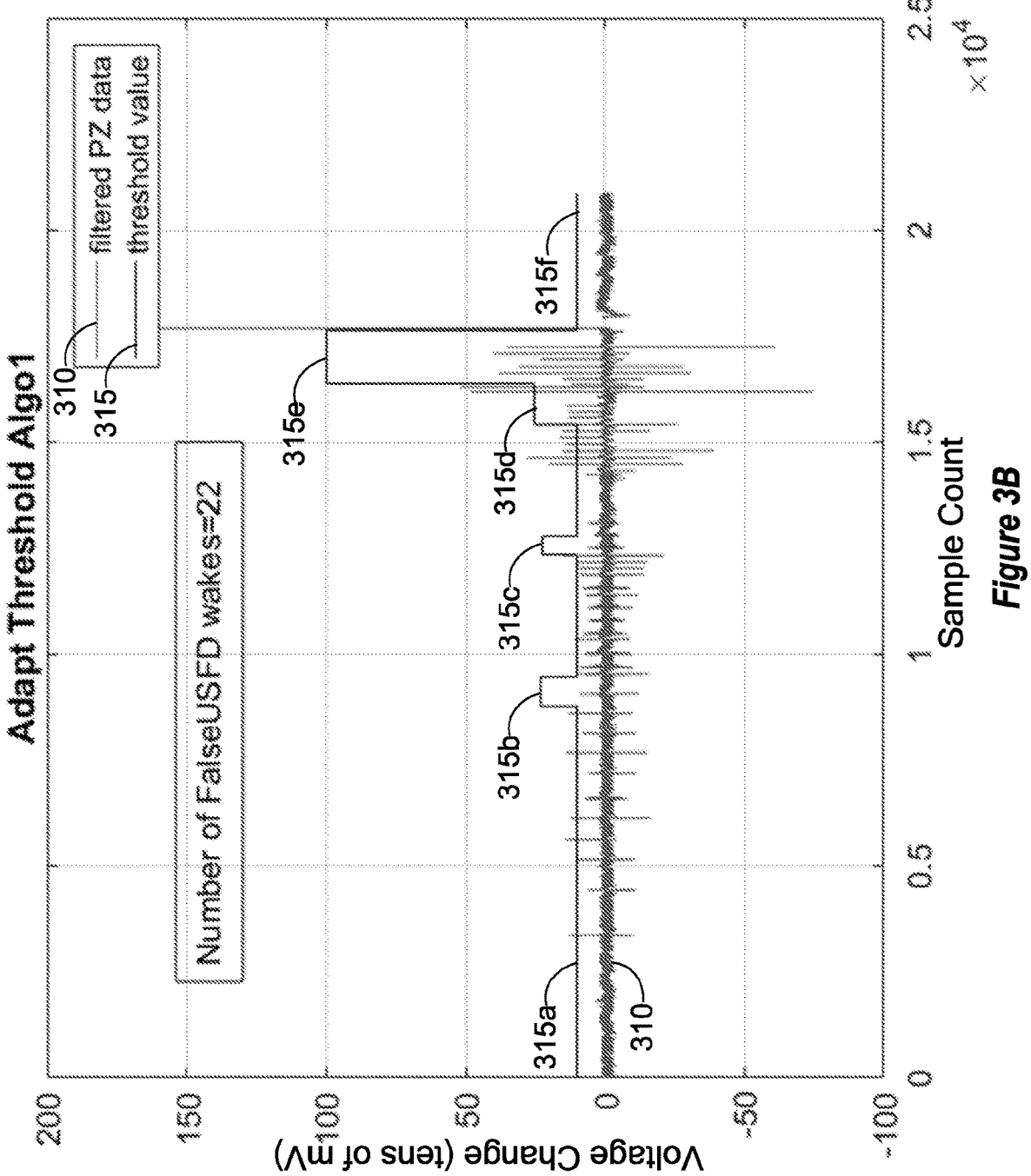
FIG. 3B shows a graph that shows example results of one method of controlling a contact indication threshold.

FIG. 3B shows a graph that shows example results of one method of controlling a contact indication threshold. As with other disclosed examples, the particular values shown in FIG. 3B, as well as the specifics of the underlying method of controlling a contact indication threshold, are merely presented by way of example.

According to this example, the contact indications 310 are filtered piezoelectric data corresponding to the output of a piezoelectric component of an ultrasonic sensor system 102. According to this example, the filtered piezoelectric data were produced by a high-pass filter for removing baseline noise. The piezoelectric component may be regarded as an instance of the wakeup sensor portion 202. In this example, the vertical axis represents voltage changes: the units shown are tens of millivolts (mV). In this example, the horizontal axis represents a sample count, with each number indicating 10,000 samples. According to this example, the sample rate was 500 Hz. According to the example, many of the contact indications 310 represent instances of banging a cellular telephone on a table. However, other contact indications 310 represent a placement of a finger on the cellular telephone in a fingerprint sensor area, in an attempt to initiate an authentication process.

According to these examples, the contact indication thresholds 315 correspond to the output of a piezoelectric sensor. Therefore, the contact indication thresholds 315 are examples of "piezoelectric thresholds," as that term is used herein. In this example, the contact indication threshold 315 was controlled according to time intervals between consecutive false wakeups. In this example, the underlying wakeup reduction method involved increasing the contact indication threshold 315 when a time interval between consecutive false wakeups (specifically, a time interval between consecutive false wakeups after a consecutive false wakeup count threshold has been exceeded) was less than a first time threshold. According to this example, the underlying wakeup reduction method involved decreasing the contact indication threshold 315 when a time interval between consecutive false wakeups was greater than or equal to a second time threshold. In this example, the first time threshold was set to one second and the second time threshold was set to 1.5 seconds, and the consecutive false wakeup count threshold was set to three.

In this example, segments 315a-315f are segments of the graphed contact indication threshold 315. During the time intervals represented by segments 315a and 315f, the contact indication threshold was at a baseline level. However, during the time intervals represented by segments 315b, 315c, 315d and 315e, the contact indication threshold was increased to a level above the baseline level. These increases were due to a time interval between consecutive false wakeups, after a consecutive false wakeup count threshold has been exceeded, being less than the first time threshold. During the time interval represented by segment 315d, the consecutive false wakeups continued and the amplitude of some corresponding contact indications was greater than that of the increased contact indication threshold of segment 315d. Therefore, the contact indication threshold was increased to that shown in segment 315e.

In this example, the contact indication threshold 315 was decreased when a time interval between consecutive false wakeups was greater than or equal to the second time threshold. According to this example, the contact indication threshold 315 was decreased to the baseline level of represented by segments 315a and 315f, even after being increased to the level represented by segment 315e. In other implementations, after being increased to the level represented by segment 315e, the contact indication threshold 315 may be decreased to the level of segment 315d if a time interval between consecutive false wakeups is greater than or equal to the second time threshold, and then decreased to the baseline level, if another time interval between consecutive false wakeups is greater than or equal to the second time threshold.

FIG. 4 is a flow diagram that provides examples of operations according to some disclosed methods. The blocks of FIG. 4 may, for example, be performed by the apparatus 101 of FIG. 1 or FIG. 3A, or by a similar apparatus. As with other methods disclosed herein, the methods outlined in FIG. 4 may include more or fewer blocks than indicated.

Moreover, the blocks of methods disclosed herein are not necessarily performed in the order indicated. In some implementations, one or more blocks may be performed concurrently.

In this example block 405 involves sending, due to a contact indication corresponding to contact of an object with an outer surface of an apparatus in a fingerprint sensor area, an activation signal to a transmitter portion of a fingerprint sensor residing in a fingerprint sensor area of the apparatus. In this example, the contact indication equals or exceeds a contact indication threshold. According to this example, block 410 involves determining, based at least in part on fingerprint sensor data obtained from the object, whether the object is a finger.

In this example block 415 involves controlling the contact indication threshold based, at least in part, on one or more time intervals between consecutive false wakeups. According to this example, a false wakeup is, or includes, an activation of the transmitter portion not due to a finger contact on the outer surface of the apparatus in the fingerprint sensor area.

In some examples, method 400 may involve increasing the contact indication threshold if a time interval between consecutive false wakeups is less than a first time threshold. In some instances, method 400 may involve decreasing the contact indication threshold if a time interval between consecutive false wakeups is greater than or equal to a second time threshold. In some implementations, the fingerprint sensor may be, or may include, a piezoelectric sensor component and the contact indication threshold may correspond with a piezoelectric threshold. Alternatively, or additionally, method 400 may involve controlling the contact indication threshold based, at least in part, one or more of a touch sensor signal, a pressure sensor signal, a microphone signal, a gyroscope signal or an accelerometer signal.

According to some examples, method 400 may involve controlling the contact indication threshold based, at least in part, on whether a count of most recent consecutive false wakeups exceeds a consecutive false wakeup count threshold. In some examples, method 400 may involve resetting a count of most recent consecutive false wakeups if it is determined that the object is a finger.

Figure 5:
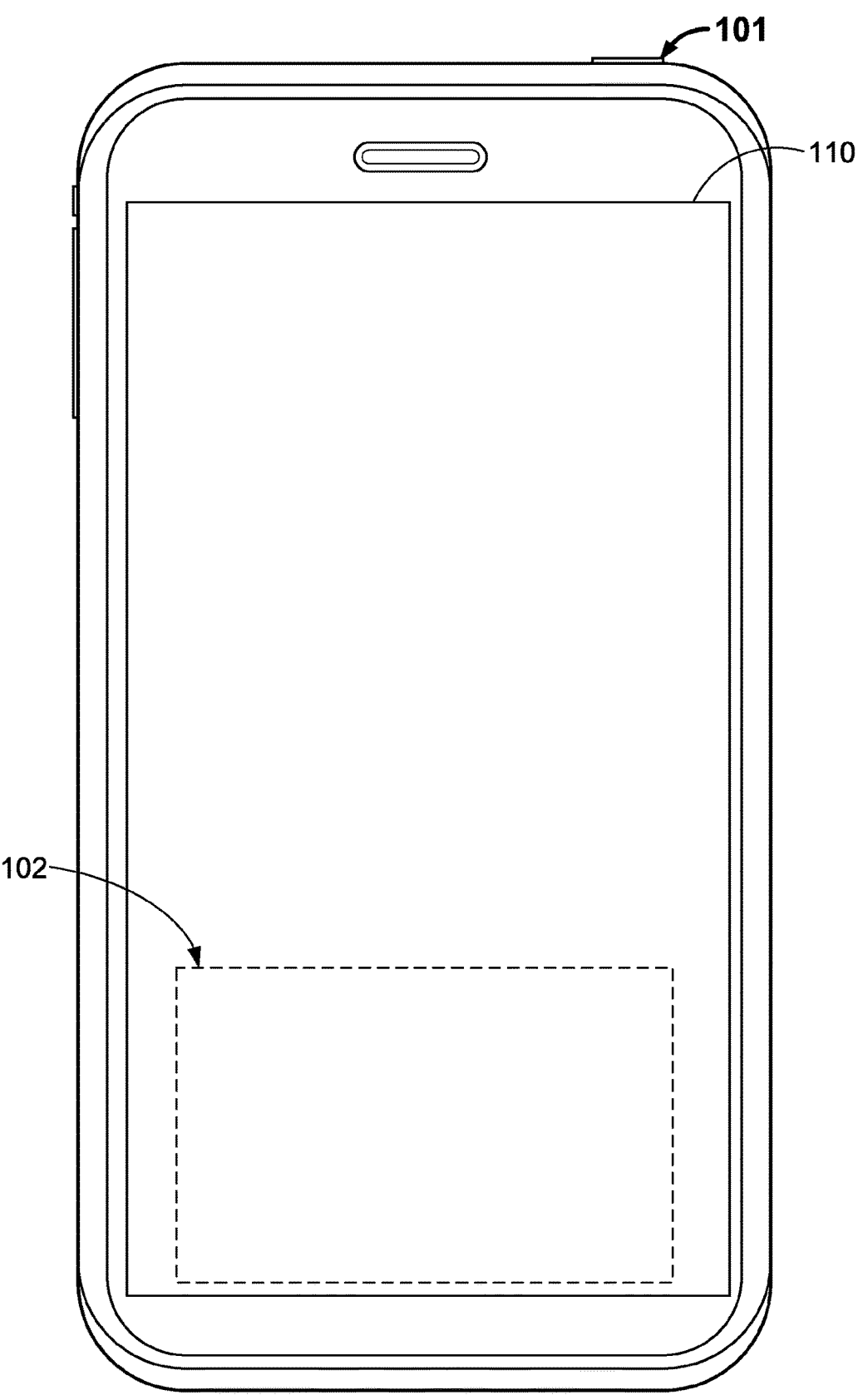
FIG. 5 shows an example of a fingerprint sensor area of an apparatus.

FIG. 5 shows an example of a fingerprint sensor area of an apparatus. In this example, the apparatus 101 is a mobile device, which in this instance is a cellular telephone. Here, the apparatus 101 includes an active area of a fingerprint sensor system 102, which is shown in a dashed outline because it resides below the display system 110 in this example. The active area of the fingerprint sensor system 102 may, for example, be the area in which an array of sensor pixels resides. The active area of the fingerprint sensor system 102 is one example of what is referred to herein as a "fingerprint sensor area." In other examples, the active area of the fingerprint sensor system 102 (and therefore the corresponding fingerprint sensor area) may be larger or smaller than that indicated in FIG. 5, or may be the same size but in a different location.

Figure 6:
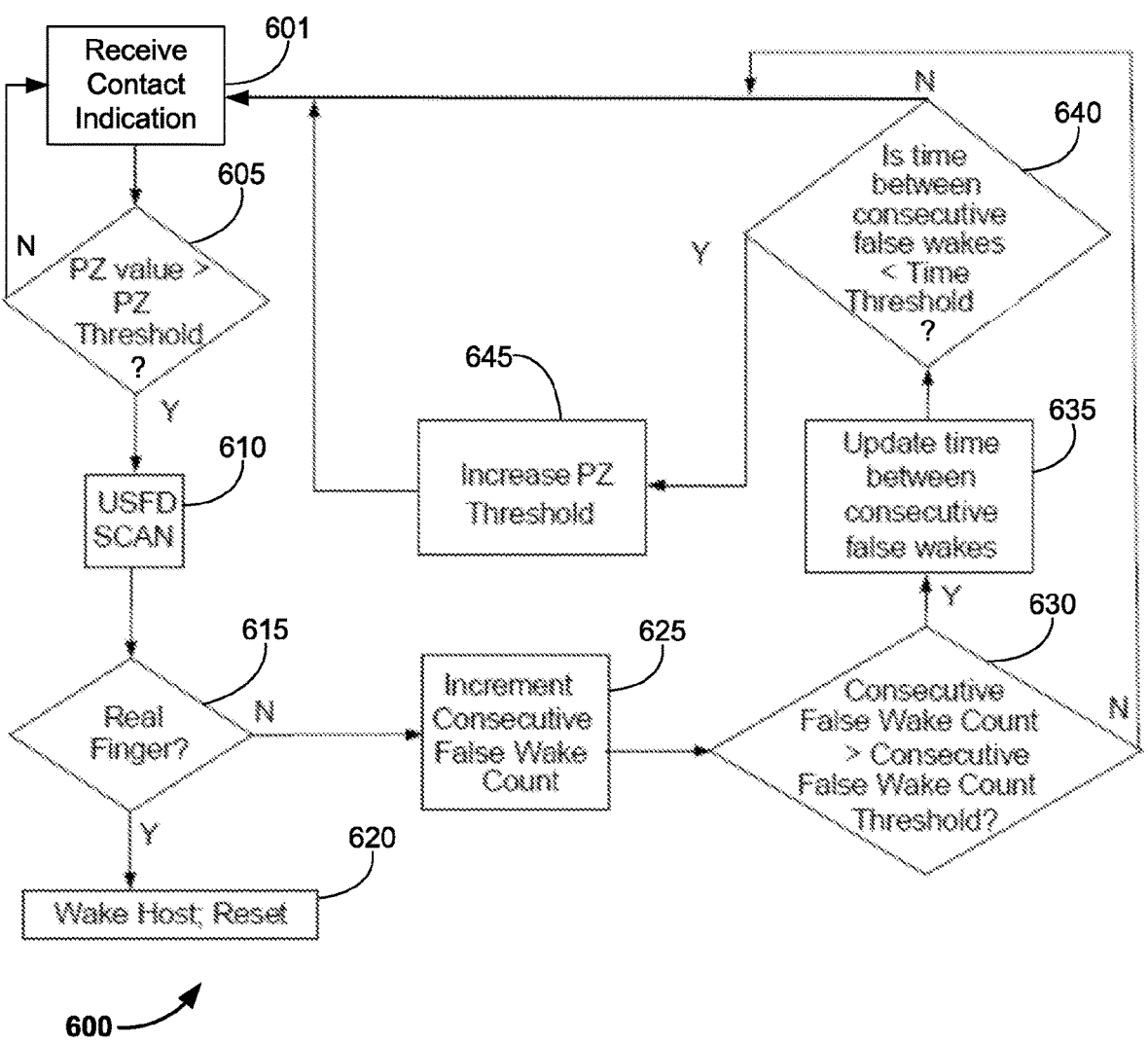
FIGS. 6 and 7 are flow diagrams that provides additional examples of operations according to some disclosed methods.
Figure 7:
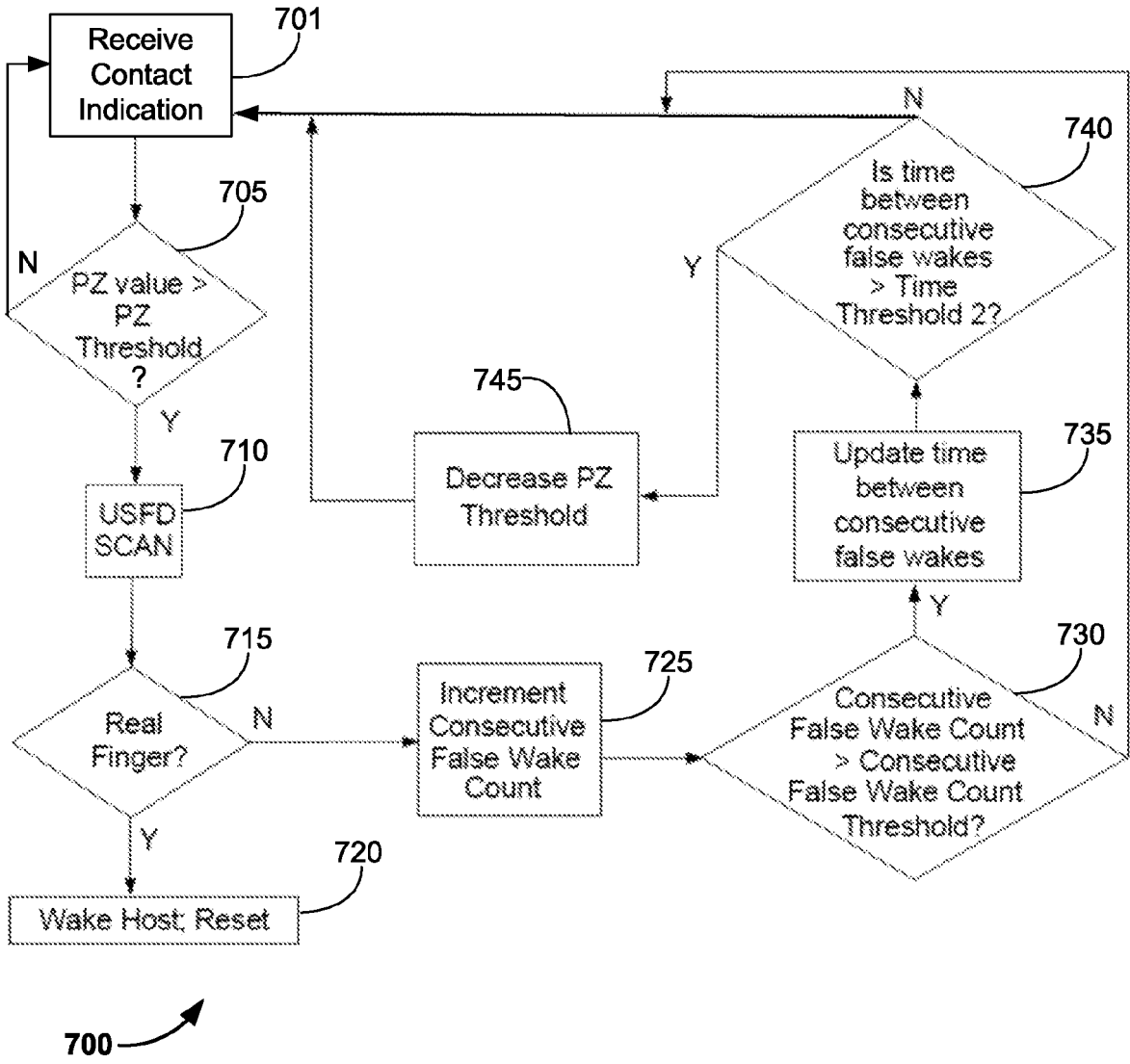

FIGS. 6 and 7 are flow diagrams that provides additional examples of operations according to some disclosed methods. The blocks of FIGS. 6 and 7 may, for example, be performed by the apparatus 101 of FIG. 1 or FIG. 3A, or by a similar apparatus. As with other methods disclosed herein, the methods outlined in FIGS. 6 and 7 may include more or fewer blocks than indicated. Moreover, the blocks of methods disclosed herein are not necessarily performed in the order indicated. In some implementations, one or more blocks of FIG. 6 and/or FIG. 7 may be performed concurrently. According to some examples, the blocks of FIG. 6 and/or FIG. 7 may be regarding as specific implementations of other disclosed methods, such as method 400 of FIG. 4.

Referring first to FIG. 6, in this example method 600 is initiated upon receiving a contact indication in block 601. In some instances, the contact indication may correspond to contact with an outer surface of an apparatus in a fingerprint sensor area. According to this example, the contact indication is, or includes, input from a piezoelectric sensor.

In this example, block 605 involves determining whether the contact indication equals or exceeds a contact indication threshold. According to this example, because the contact indication is, or includes, input from a piezoelectric sensor, the contact indication threshold is a piezoelectric (PZ) threshold, such as a voltage threshold. In this example, if the contact indication equals or exceeds the contact indication threshold, the process continues to block 610.

According to this example, block 610 involves activating an ultrasonic transmitter and initiating an ultrasonic finger detection (USFD) process. In some examples, if the contact indication equals or exceeds the contact indication threshold, the wakeup sensor portion 202 of FIG. 3A may send an activation signal 204 to the transmitter portion 207.

In this example, block 615 involves determining whether a finger is touching the fingerprint sensor area. If it is determined in block 615 that a finger is touching the fingerprint sensor area, the process continues to block 620: in this example, at least a portion of a control system (for example, a portion of a host processor) that is implementing fingerprint image data processing functionality will receive a host wakeup signal 208. In some examples, the fingerprint image data processing control system portion 206*b* of FIG. 3A will receive a host wakeup signal 208 and fingerprint image data 209. Moreover, in this example, a consecutive false wakeup count will be reset to zero in block 620.

However, if it is determined in block 615 that a finger is not touching the fingerprint sensor area, the process continues to block 625. In this example, block 625 involves incrementing (adding one count to) the consecutive false wakeup count.

In some instances, the finger estimation process of block 615 may lead to an incorrect determination. For example, in some instances the finger estimation process of block 615 may lead to an estimation that an actual finger is touching the fingerprint sensor area, whereas in fact a finger-like object may not be touching the fingerprint sensor area. In some such instances, the portion of the control system that is implementing fingerprint image data processing functionality may determine that the finger-like object is not actually a finger. In some such examples, the process may continue to block 625 and the consecutive false wakeup count will be incremented.

According to the example shown in FIG. 6, block 630 involves determining whether the current consecutive false wakeup count exceeds a consecutive false wakeup count threshold. In some examples, the consecutive false wakeup count threshold may be a single-digit threshold, such as 2, 3, 4, 5, 6, 7, 8 or 9. In some alternative examples, block 630 may involve determining whether the current consecutive false wakeup count equals or exceeds a consecutive false wakeup count threshold. In this example, if it is determined in block 630 that the current consecutive false wakeup count exceeds the consecutive false wakeup count threshold, the process continues to block 635.

According to this example, block 635 involves determining the time interval between consecutive false wakeups (such as the time interval between the last two false wakeups). In this example, block 635 involves updating a previously-stored time interval between consecutive false wakeups (for example, a time interval corresponding to a previous false wakeup that was stored in a buffer) with a current value of the time interval.

In this implementation, block 640 involves determining whether the time interval between consecutive false wakeups (in this example, the time interval between the last two false wakeups) is less than a first time threshold. In some alternative examples, block 640 may involve determining whether the time interval between consecutive false wakeups is less than or equal to the first time threshold. The first time threshold may vary according to the particular implementation. In some instances, the first time threshold may be on the order of hundreds of milliseconds (ms) or seconds. In some examples, the first time threshold may be 600 ms, 700 ms, 800 ms, 900 ms, 1 second, 1100 ms, 1200 ms, 1300 ms, 1400 ms, etc.

According to this example, if it is determined in block 640 that the time interval between consecutive false wakeups is less than the first time threshold, method 600 involves increasing the contact indication threshold. In this particular example, if it is determined in block 640 that the time interval between consecutive false wakeups is less than the first time threshold, block 645 involves increasing the piezoelectric threshold that was referenced above with reference to block 605. According to this example, if it is determined in block 640 that the time interval between consecutive false wakeups is not less than the first time threshold, the process reverts to block 601 and a control system implementing the method awaits receipt of another contact indication.

Referring now to FIG. 7, in this example blocks 701, 705, 710, 715, 720, 725, 730 and 735 of method 700 may be performed in the same manner blocks 601, 605, 610, 615, 620, 625, 630 and 635 of method 600, unless noted otherwise in the description of FIG. 7. Therefore, the description of these steps will not be repeated here.

In this implementation, block 740 involves determining whether the time interval between consecutive false wakeups (in this example, the time interval between the last two false wakeups) is greater than a second time threshold. In some alternative examples, block 740 may involve determining whether the time interval between consecutive false wakeups is greater than or equal to the second time threshold. The second time threshold may vary according to the particular implementation. In some instances, the second time threshold may be greater than or equal to the first time threshold. For example, the second time threshold may be 1 second, 1100 ms, 1200 ms, 1300 ms, 1400 ms, 1500 ms, 1600 ms, 1700 ms, 1800 ms, 1900 ms, 2 seconds, etc.

According to this example, if it is determined in block 740 that the time interval between consecutive false wakeups is greater than the second time threshold, method 700 involves decreasing the contact indication threshold. In this particular example, if it is determined in block 740 that the time interval between consecutive false wakeups is greater than the second time threshold, block 745 involves decreasing the piezoelectric threshold that was referenced above with reference to block 605. According to this example, if it is determined in block 740 that the time interval between consecutive false wakeups is not greater than the second time threshold, the process reverts to block 701 and a control system implementing the method awaits receipt of another contact indication.

Figure 8:
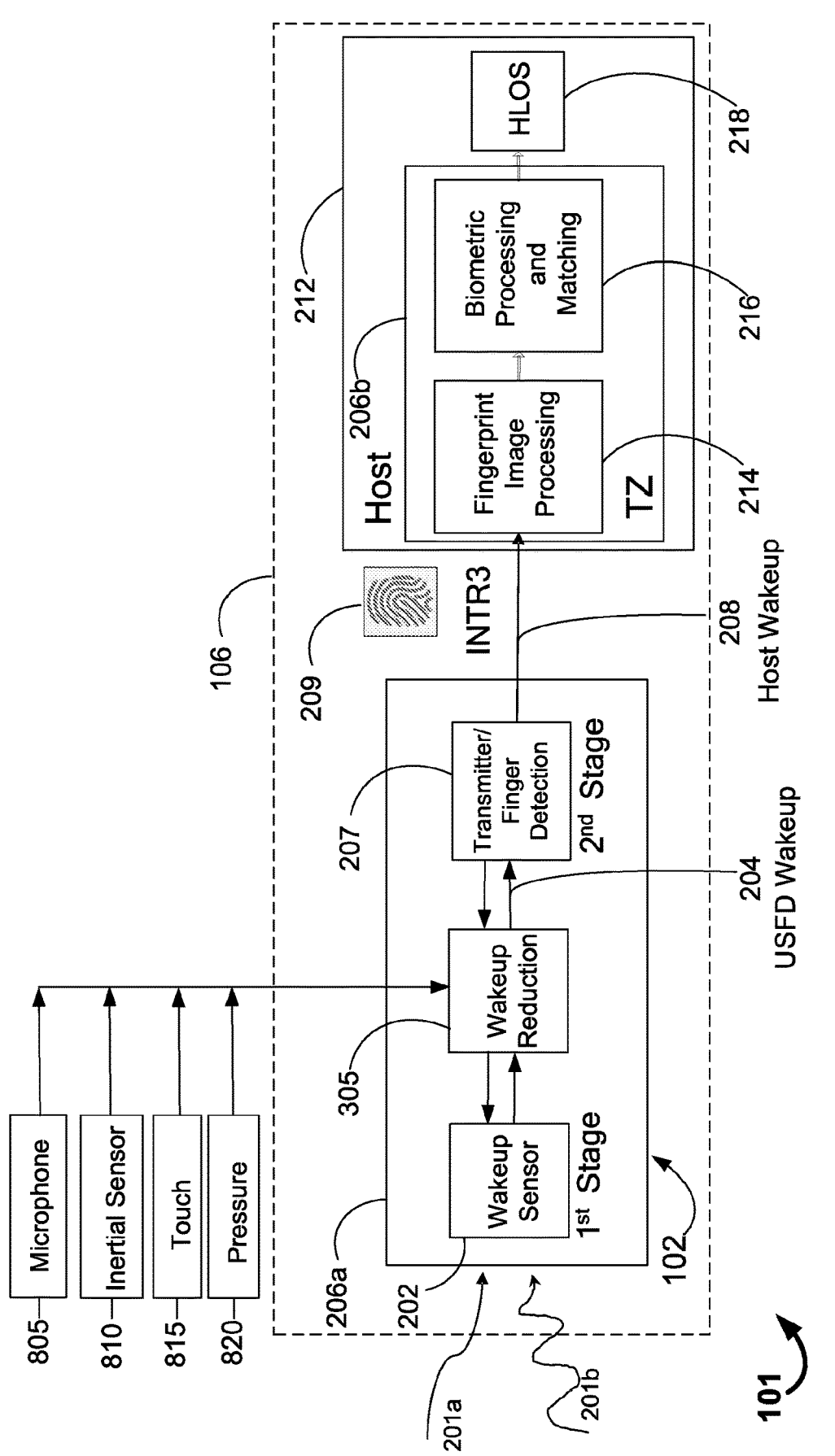
FIG. 8 shows an example of an implementation in which a wakeup reduction process may be based, at least in part, on one or more microphone signals, inertial sensor signals, touch sensor signals and/or pressure sensor signals.

FIG. 8 shows an example of an implementation in which a wakeup reduction process may be based, at least in part, on one or more microphone signals, inertial sensor signals, touch sensor signals and/or pressure sensor signals. As with other disclosed implementations, the scale, numbers, arrangements and types of the elements shown in FIG. 8 are merely presented for illustrative purposes. Other implementations of the apparatus 101 may have different numbers, arrangements and/or types of elements.

According to this example, the apparatus 101 includes at least one microphone 805, at least one inertial sensor 810 (which may include one or more accelerometers and/or one or more gyroscopes), at least one touch sensor 815 and at least one pressure sensor 820. In this implementation, the wakeup reduction module 305 is configured to receive microphone signals, inertial sensor signals, touch sensor signals and pressure sensor signals. According to this implementation the wakeup reduction module 305 is configured to control a contact indication threshold used by the wakeup sensor portion 202 (and/or otherwise control the fingerprint sensor system 102) based, at least in part, on one or more microphone signals, accelerometer signals, touch sensor signals and/or pressure sensor signals.

In some implementations, if the wakeup reduction module 305 receives accelerometer signals and/or gyroscope signals indicating that the apparatus 101 is being rotated and/or accelerated, the wakeup reduction module 305 may be configured to temporarily prevent activation signals 204 to the transmitter portion 207. Such implementations may, in some instances, prevent temporary lockups of the apparatus that may be caused by exceeding a number of allowed authentication attempts within a time window. In some examples, if the wakeup reduction module 305 receives accelerometer signals and/or gyroscope signals indicating that the apparatus 101 is being rotated and/or accelerated, the wakeup reduction module 305 may be configured to increase the contact indication threshold.

According to some examples, if the wakeup reduction module 305 receives microphone signals corresponding with a non-finger object tapping against the apparatus 101, the wakeup reduction module 305 may be configured to increase the contact indication threshold or to temporarily prevent activation signals 204 to the transmitter portion 207. For example, sounds caused by some non-finger objects tapping against the apparatus 101 (e.g., an earbud case, one or more coins, or other objects in a user's pocket) may produce a higher range of frequencies than sounds caused by a finger tap. In some such examples, the wakeup reduction module 305 may control the fingerprint sensor system 102 due to receiving microphone signals indicating sounds characteristic of one or more non-finger objects tapping against the apparatus 101.

In some examples, if the wakeup reduction module 305 receives touch sensor signals and/or pressure sensor signals, such as touch sensor signals and/or pressure sensor signals that do not correspond with a finger pressing or tapping on a fingerprint area, the wakeup reduction module 305 may be configured to increase the contact indication threshold and/ or to temporarily prevent activation signals 204 to the transmitter portion 207.

Figure 9:
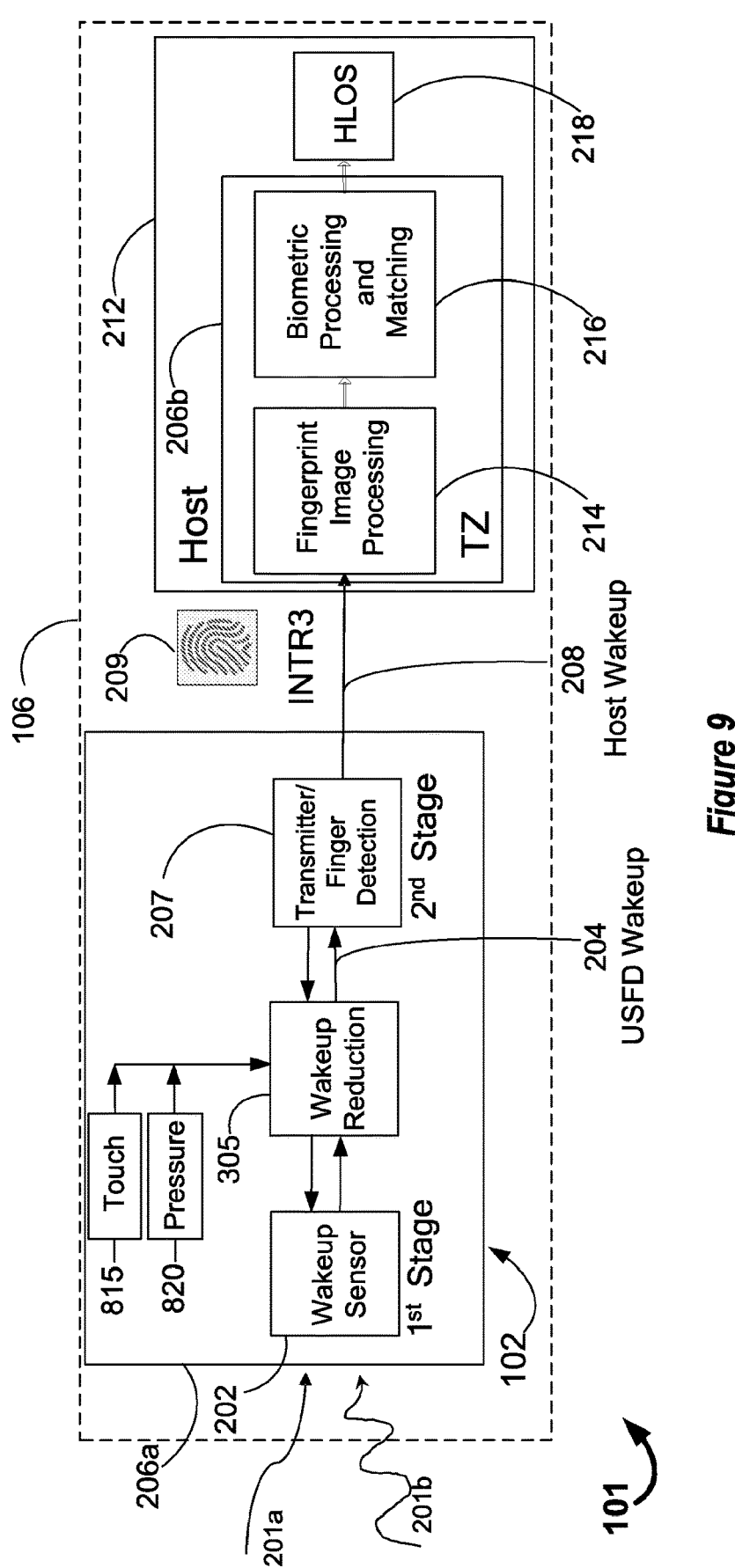
FIG. 9 shows another example of an implementation in which a wakeup reduction process may be based, at least in part, on one or more touch sensor signals and/or pressure sensor signals.

FIG. 9 shows another example of an implementation in which a wakeup reduction process may be based, at least in part, on one or more touch sensor signals and/or pressure sensor signals. As with other disclosed implementations, the scale, numbers, arrangements and types of the elements shown in FIG. 9 are merely presented for illustrative purposes. Other implementations of the apparatus 101 may have different numbers, arrangements and/or types of elements.

According to this example, the apparatus 101 includes at least one touch sensor 815 and at least one pressure sensor 820 that are integrated into at least a portion of the fingerprint sensor system 102. In this implementation, the touch sensor 815 and the pressure sensor 820 reside on an integrated circuit that is configured to implement the fingerprint sensor control system portion 206a. According to some implementations, the wakeup reduction module 305 may use touch sensor signals and/or pressure sensor signals as described above with reference to FIG. 8.

Figure 10:
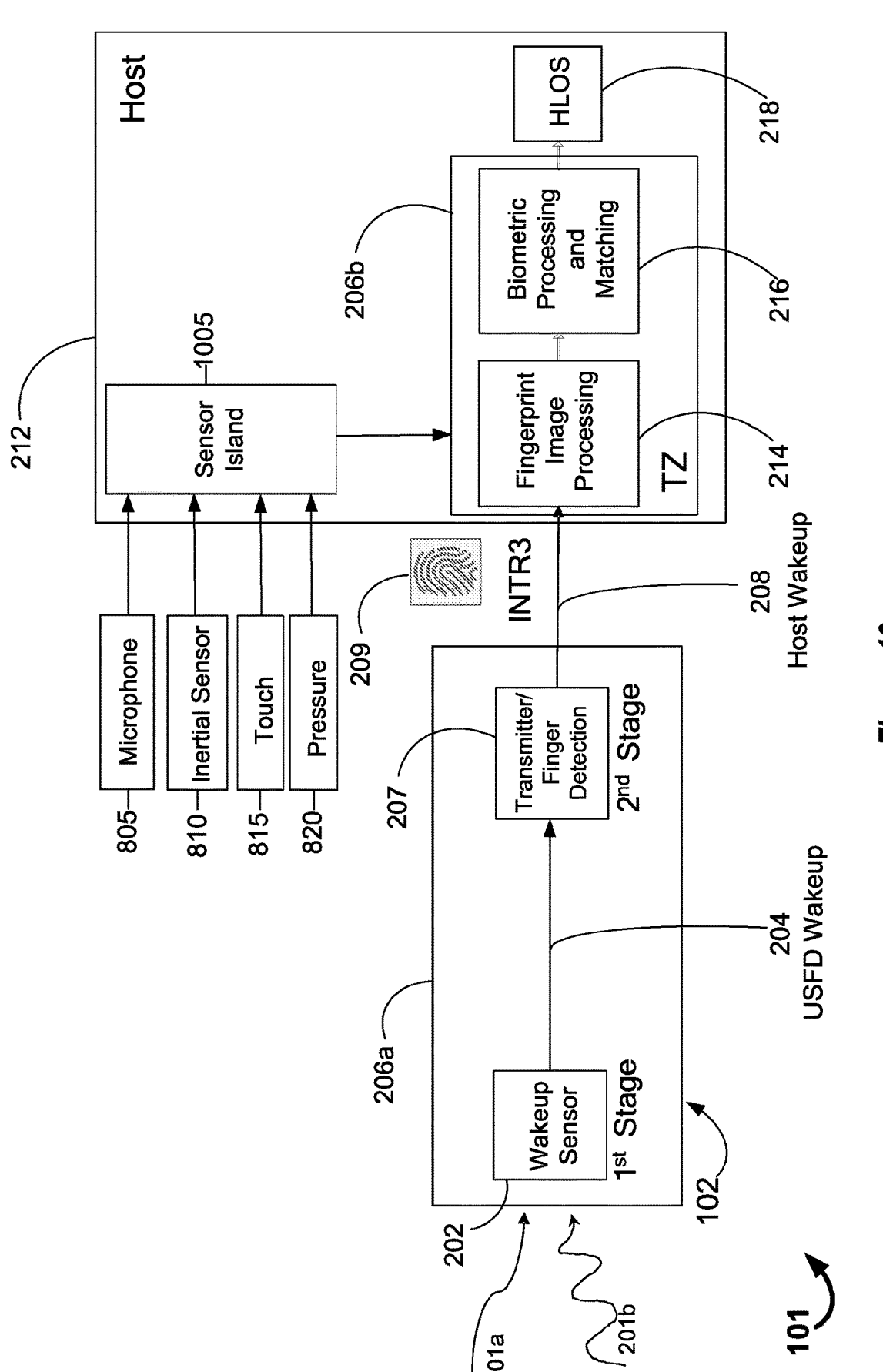
FIG. 10 shows another example of an implementation in which a wakeup reduction process may be based, at least in part, on one or more microphone signals, inertial sensor signals, touch sensor signals and/or pressure sensor signals.

FIG. 10 shows another example of an implementation in which a wakeup reduction process may be based, at least in part, on one or more microphone signals, inertial sensor signals, touch sensor signals and/or pressure sensor signals. As with other disclosed implementations, the scale, numbers, arrangements and types of the elements shown in FIG. 10 are merely presented for illustrative purposes. Other implementations of the apparatus 101 may have different numbers, arrangements and/or types of elements.

In this example, the fingerprint sensor system 102 does not include a wakeup reduction module 305. Instead, in this implementation, at least some wakeup reduction functionality may be implemented by the host processor 212. According to this example, the host processor 212 includes a sensor island 1005, which is configured to receive and process signals from the microphone 805, inertial sensor 810, touch sensor 815 and pressure sensor 820. In some instances, the host processor 212 may temporarily prevent host wakeup signals 208 from activating the fingerprint image data processing functionality of the host processor 212 based at least in part on one or more microphone signals, inertial sensor signals, touch sensor signals and/or pressure sensor signals. In this example, the host processor 212 may temporarily prevent host wakeup signals 208 from activating the fingerprint image data processing control system portion 206b based at least in part on one or more microphone signals, inertial sensor signals, touch sensor signals and/or pressure sensor signals. In some implementations, the host processor 212 may temporarily prevent the wakeup sensor portion 202 from sending activation signals 204 to the transmitter portion 207 based at least in part on one or more microphone signals, inertial sensor signals, touch sensor signals and/or pressure sensor signals.

FIG. 11 is a flow diagram that provides examples of operations according to some additional disclosed methods. The blocks of FIG. 11 may, for example, be performed by the apparatus 101 of FIG. 10 or by a similar apparatus. As with other methods disclosed herein, the methods outlined in FIG. 11 may include more or fewer blocks than indicated. Moreover, the blocks of methods disclosed herein are not necessarily performed in the order indicated. In some implementations, one or more blocks of method 1100 may be performed concurrently.

In this example, block 1105 involves receiving, by a first portion of a control system, at least one sensor signal. According to this example, the at least one sensor signal is associated with contact of an object with an outer surface of an apparatus and/or movement of the apparatus. In some examples, the at least one sensor signal may be, or may include, a touch sensor signal, a pressure sensor signal, a microphone signal and/or an accelerometer signal. In this implementation, the first portion of a control system is configured for controlling fingerprint image data processing. The first portion of the control system may be, or may include, a host processor. The first portion of the control system may, in some examples, include the fingerprint image data processing control system portion 206b.

According to this example, block 1110 involves controlling communications between a second portion of a control system and the first portion of the control system based, at least in part, on the at least one sensor signal. In this instance, the second portion of the control system is configured for controlling a transmitter portion of a fingerprint sensor. The second portion of the control system may in some examples, include the fingerprint sensor control system portion 206a. According to some examples, block 1110 may involve temporarily preventing host wakeup signals (such as the host wakeup signals 208 described elsewhere herein) from activating the fingerprint image data processing control system portion 206b. In some examples, block 1110 may involve temporarily preventing host wakeup signals from being transmitted by the second portion of a control system. Alternatively, or additionally, block 1110 may involve temporarily preventing operation of a transmitter portion of a fingerprint sensor system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. An apparatus, comprising: a fingerprint sensor residing in a fingerprint sensor area of the apparatus, the fingerprint sensor including a wakeup sensor portion and a transmitter portion, the wakeup sensor portion configured to send an activation signal to the transmitter portion due to a contact indication corresponding to contact with an outer surface of the apparatus in the fingerprint sensor area that equals or exceeds a contact indication threshold; and a control system, comprising: a fingerprint sensor control system portion configured for controlling the transmitter portion and for determining, based at least in part on fingerprint sensor data obtained from an object in contact with the outer surface of the apparatus in the fingerprint sensor area, whether the object is a finger; a fingerprint image data processing control system portion; and a wakeup reduction module configured to control the contact indication threshold based, at least in part, on one or more time intervals between consecutive false wakeups, a false wakeup comprising an activation of the transmitter portion, by the wakeup sensor portion, not due to a finger contact on the outer surface of the apparatus in the fingerprint sensor area.

2. The apparatus of clause 1, wherein the wakeup reduction module is configured to increase the contact indication threshold if a time interval between consecutive false wakeups is less than a first time threshold.

3. The apparatus of clause 1 or clause 2, wherein the wakeup reduction module is configured to decrease the contact indication threshold if a time interval between consecutive false wakeups is greater than or equal to a second time threshold.

4. The apparatus of any one of clauses 1-3, wherein the fingerprint sensor includes a piezoelectric sensor component and wherein the contact indication threshold corresponds with a piezoelectric threshold.

5. The apparatus of clause 4, wherein the fingerprint sensor control system portion comprises a dedicated processor on which the piezoelectric sensor component resides.

6. The apparatus of any one of clauses 1-5, wherein the wakeup reduction module is a component of the fingerprint sensor control system portion.

7. The apparatus of any one of clauses 1-6, wherein the wakeup reduction module is configured to control the contact indication threshold based, at least in part, on whether a count of most recent consecutive false wakeups exceeds a consecutive false wakeup count threshold.

8. The apparatus of any one of clauses 1-7, wherein the control system is further configured to reset a count of most recent consecutive false wakeups if the fingerprint sensor control system portion determines that the object is a finger.

9. The apparatus of any one of clauses 1-8, wherein the apparatus further comprises at least one of a touch sensor or a pressure sensor and wherein the wakeup reduction module configured to control the contact indication threshold based, at least in part, on one or more touch sensor signals, on one or more pressure sensor signals or on both one or more touch sensor signals and one or more pressure sensor signals.

10. The apparatus of clause 9, wherein the fingerprint sensor control system portion is integrated with the touch sensor or the pressure sensor.

11. The apparatus of any one of clauses 1-10, wherein the apparatus further comprises at least one of a microphone, a gyroscope or an accelerometer and wherein the wakeup reduction module configured to control the contact indication threshold based, at least in part, on one or more of microphone signals, gyroscope signals or accelerometer signals.

12. The apparatus of any one of clauses 1-11, wherein the apparatus is a handset.

13. A method, comprising: sending, due to a contact indication corresponding to contact of an object with an outer surface of an apparatus in a fingerprint sensor area, an activation signal to a transmitter portion of a fingerprint sensor residing in a fingerprint sensor area of the apparatus, the contact indication equaling or exceeding a contact indication threshold; determining, based at least in part on fingerprint sensor data obtained from the object, whether the object is a finger; and controlling the contact indication threshold based, at least in part, on one or more time intervals between consecutive false wakeups, a false wakeup comprising an activation of the transmitter portion not due to a finger contact on the outer surface of the apparatus in the fingerprint sensor area.

14. The method of clause 13, further comprising increasing the contact indication threshold if a time interval between consecutive false wakeups is less than a first time threshold.

15. The method of clause 13 or clause 14, further comprising decreasing the contact indication threshold if a time interval between consecutive false wakeups is greater than or equal to a second time threshold.

16. The method of any one of clauses 13-15, wherein the fingerprint sensor includes a piezoelectric sensor component and wherein the contact indication threshold corresponds with a piezoelectric threshold.

17. The method of any one of clauses 13-16, further comprising controlling the contact indication threshold based, at least in part, on whether a count of most recent consecutive false wakeups exceeds a consecutive false wakeup count threshold.

18. The method of any one of clauses 13-17, further comprising resetting a count of most recent consecutive false wakeups if it is determined that the object is a finger.

19. The method of any one of clauses 13-18, further comprising controlling the contact indication threshold based, at least in part, one or more of a touch sensor signal, a pressure sensor signal, a microphone signal, a gyroscope signal or an accelerometer signal.

20. A method, comprising: receiving, by a first portion of a control system, at least one sensor signal, the at least one sensor signal being associated with at least one of contact of an object with an outer surface of an apparatus or movement of the apparatus, the first portion of the control system being configured for controlling fingerprint image data processing; and controlling communications between a second portion of a control system and the first portion of the control system based, at least in part, on the at least one sensor signal, the second portion of the control system being configured for controlling a transmitter portion of a fingerprint sensor.

The invention claimed is:

1. An apparatus, comprising:
a fingerprint sensor residing in a fingerprint sensor area of the apparatus, the fingerprint sensor including a wakeup sensor portion and a transmitter portion, the wakeup sensor portion configured to send an activation signal to the transmitter portion due to a contact indication corresponding to contact with an outer surface of the apparatus in the fingerprint sensor area that equals or exceeds a contact indication threshold; and
a control system, comprising:
a fingerprint sensor control system portion configured for controlling the transmitter portion and for determining, based at least in part on fingerprint sensor data obtained from an object in contact with the outer surface of the apparatus in the fingerprint sensor area, whether the object is a finger;
a fingerprint image data processing control system portion; and
a wakeup reduction module configured to control the contact indication threshold based, at least in part, on one or more time intervals between consecutive false wakeups, a false wakeup comprising an activation of the transmitter portion, by the wakeup sensor portion, not due to a finger contact on the outer surface of the apparatus in the fingerprint sensor area.

2. The apparatus of claim 1, wherein the wakeup reduction module is configured to increase the contact indication threshold if a time interval between consecutive false wakeups is less than a first time threshold.

3. The apparatus of claim 1, wherein the wakeup reduction module is configured to decrease the contact indication threshold if a time interval between consecutive false wakeups is greater than or equal to a second time threshold.

4. The apparatus of claim 1, wherein the fingerprint sensor includes a piezoelectric sensor component and wherein the contact indication threshold corresponds with a piezoelectric threshold.

5. The apparatus of claim 4, wherein the fingerprint sensor control system portion comprises a dedicated processor on which the piezoelectric sensor component resides.

6. The apparatus of claim 1, wherein the wakeup reduction module is a component of the fingerprint sensor control system portion.

7. The apparatus of claim 1, wherein the wakeup reduction module is configured to control the contact indication threshold based, at least in part, on whether a count of most recent consecutive false wakeups exceeds a consecutive false wakeup count threshold.

8. The apparatus of claim 1, wherein the control system is further configured to reset a count of most recent consecutive false wakeups if the fingerprint sensor control system portion determines that the object is a finger.

9. The apparatus of claim 1, wherein the apparatus further comprises at least one of a touch sensor or a pressure sensor and wherein the wakeup reduction module configured to control the contact indication threshold based, at least in part, on one or more touch sensor signals, on one or more pressure sensor signals or on both one or more touch sensor signals and one or more pressure sensor signals.

10. The apparatus of claim 9, wherein the fingerprint sensor control system portion is integrated with the touch sensor or the pressure sensor.

11. The apparatus of claim 1, wherein the apparatus further comprises at least one of a microphone, a gyroscope or an accelerometer and wherein the wakeup reduction module configured to control the contact indication threshold based, at least in part, on one or more of microphone signals, gyroscope signals or accelerometer signals.

12. The apparatus of claim 1, wherein the apparatus is a handset.

13. A method, comprising:
  sending, due to a contact indication corresponding to contact of an object with an outer surface of an apparatus in a fingerprint sensor area, an activation signal to a transmitter portion of a fingerprint sensor residing in a fingerprint sensor area of the apparatus, the contact indication equaling or exceeding a contact indication threshold;
  determining, based at least in part on fingerprint sensor data obtained from the object, whether the object is a finger; and
  controlling the contact indication threshold based, at least in part, on one or more time intervals between consecutive false wakeups, a false wakeup comprising an activation of the transmitter portion not due to a finger contact on the outer surface of the apparatus in the fingerprint sensor area.

14. The method of claim 13, further comprising increasing the contact indication threshold if a time interval between consecutive false wakeups is less than a first time threshold.

15. The method of claim 13, further comprising decreasing the contact indication threshold if a time interval between consecutive false wakeups is greater than or equal to a second time threshold.

16. The method of claim 13, wherein the fingerprint sensor includes a piezoelectric sensor component and wherein the contact indication threshold corresponds with a piezoelectric threshold.

17. The method of claim 13, further comprising controlling the contact indication threshold based, at least in part, on whether a count of most recent consecutive false wakeups exceeds a consecutive false wakeup count threshold.

18. The method of claim 13, further comprising resetting a count of most recent consecutive false wakeups if it is determined that the object is a finger.

19. The method of claim 13, further comprising controlling the contact indication threshold based, at least in part, one or more of a touch sensor signal, a pressure sensor signal, a microphone signal, a gyroscope signal or an accelerometer signal.

* * * * *